US012726952B2

(12) United States Patent
Wang et al.

(10) Patent No.: US 12,726,952 B2

(45) Date of Patent: Sep. 1, 2026

(54) METHOD AND APPARATUS FOR DETERMINING TARGET RESOURCE TYPE, AND COMMUNICATION DEVICE

(71) Applicant: VIVO MOBILE COMMUNICATION CO., LTD., Chang'an Dongguan (CN)

(72) Inventors: Huan Wang, Chang'an Dongguan (CN); Jinhua Liu, Chang'an Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 442 days.

(21) Appl. No.: 18/157,331

(22) Filed: Jan. 20, 2023

(65) Prior Publication Data

US 2023/0156673 A1 May 18, 2023

Related U.S. Application Data

(63) Continuation of application No. PCT/CN2021/108052, filed on Jul. 23, 2021.

(30) Foreign Application Priority Data

Jul. 27, 2020 (CN) ........................ 202010733275.1

(51) Int. Cl.
*H04W 72/044* (2023.01)
*H04W 72/20* (2023.01)

(52) U.S. Cl.
CPC ......... *H04W 72/044* (2013.01); *H04W 72/20* (2023.01)

(58) Field of Classification Search
None
See application file for complete search history.

(56) References Cited

U.S. PATENT DOCUMENTS

2020/0145991 A1 5/2020 Abedini et al.
2021/0144718 A1* 5/2021 Jyothi .................. H04W 72/53
2022/0394679 A1* 12/2022 Liu .................... H04B 7/15542
2023/0126621 A1* 4/2023 You ......................... H04L 5/003
2023/0276411 A1* 8/2023 Choi .................... H04W 84/04 370/329

FOREIGN PATENT DOCUMENTS

CN 110536466 A 12/2019
WO 2020092596 A1 5/2020

OTHER PUBLICATIONS

AT&T "RI-1813975 Summary of 7.2.3.1 Enhancements to support NR backhaul links" 3GPP TSG RAN WGJ Meeting #95, Nov. 16, 2018 (Nov. 16, 2018), 23 pgs.

CMCC "RI-1912533 Discussion on resource multiplexing among backhaul and access links", 3GPP TSG RAN WGJ #99, Nov. 22, 2019 (Nov. 22, 2019), 9 pgs.

(Continued)

*Primary Examiner* — The Hy Nguyen

(74) *Attorney, Agent, or Firm* — The Webb Law Firm

(57) ABSTRACT

This application discloses a method and apparatus for determining a target resource type, and a communication device, and belongs to the field of communication. The method includes: in a case that of being connected to at least two parent IAB nodes, determining a target resource type according to resource type indication information received from at least one of the parent IAB nodes.

18 Claims, 6 Drawing Sheets

500

S502

In a case of being connected to at least two parent IAB nodes, determine the target resource type based on the resource type indication information and an obtained limiting condition

(56) References Cited

OTHER PUBLICATIONS

Nokia et al. "RI-1912716 Mechanisms for resource multiplexing among backhaul and access links", 3GPP TSG RAN WGJ #99, Nov. 22, 2019 (Nov. 22, 2019), 11 pgs.
CMCC "RI-2008029 Discussion on resource multiplexing in the simultaneous operation", 3GPP TSG RAN WGJ #103-e, Nov. 13, 2020 (Nov. 13, 2020), 5 pgs.
International Patent Application No. PCT/CN2021/108052, International Search Report and Written Opinion with Partial English Machine Translation mailed Oct. 21, 2021, 12 pages.
VIVO "RI-2102538 Enhancement to resource multiplexing between child and parent links", 3GPP TSG RAN WGJ #104b-e, Apr. 20, 2021 (Apr. 20, 2021), 9 pgs.
Qualcomm Incorporated, "Resource Management in IAB Network", 3GPP TSG RAN WG1 #95, Spokane, US, Nov. 12-16, 2018, R1-1813419.
Ericsson, "On Multi-connectivity for IAB", 3GPP TSG-RAN WG2 Meeting #109bis-e, Online, Apr. 20-30, 2020, R2-2003300.

* cited by examiner

Figure 2:
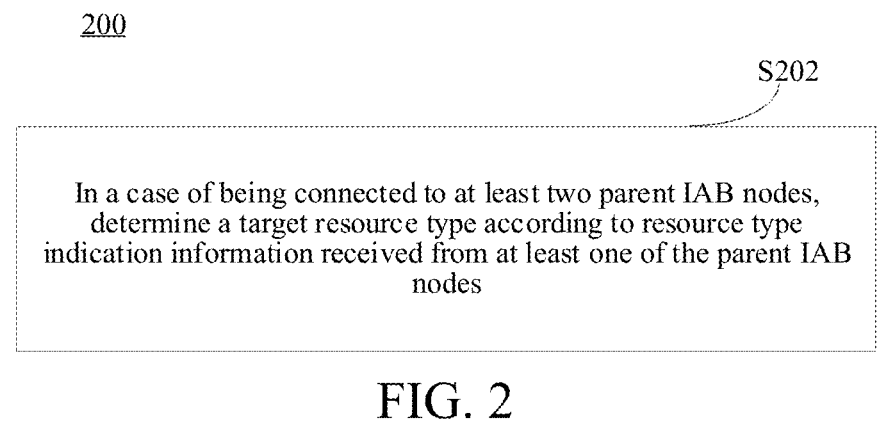

200

S202

In a case of being connected to at least two parent IAB nodes, determine a target resource type according to resource type indication information received from at least one of the parent IAB nodes

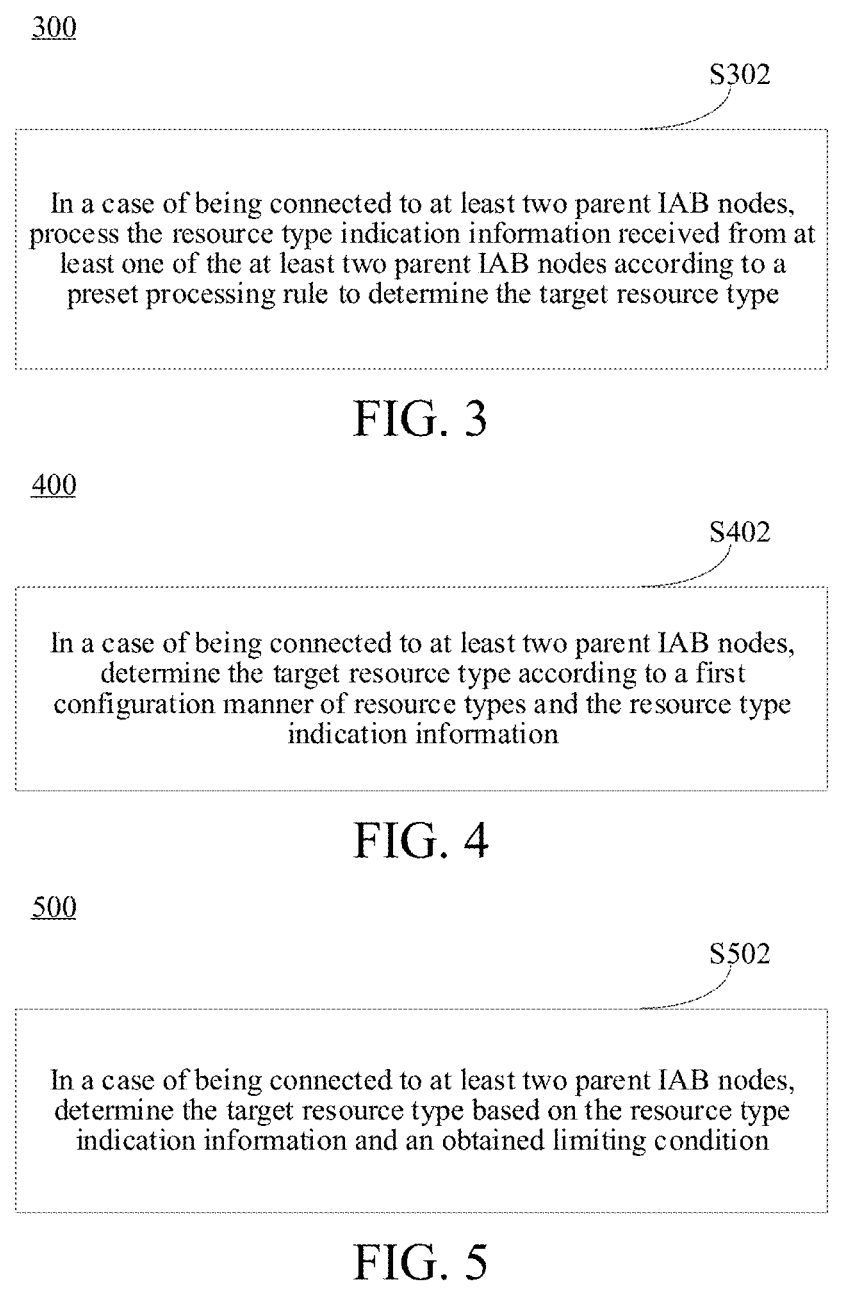

In a case of being connected to at least two parent IAB nodes, process the resource type indication information received from at least one of the at least two parent IAB nodes according to a preset processing rule to determine the target resource type

In a case of being connected to at least two parent IAB nodes, determine the target resource type according to a first configuration manner of resource types and the resource type indication information

In a case of being connected to at least two parent IAB nodes, determine the target resource type based on the resource type indication information and an obtained limiting condition

FIG. 5

METHOD AND APPARATUS FOR DETERMINING TARGET RESOURCE TYPE, AND COMMUNICATION DEVICE

CROSS-REFERENCE TO RELATED APPLICATIONS

This application is a continuation of International Application No. PCT/CN2021/108052, filed on Jul. 23, 2021, which claims priority to Chinese Patent Application No. 202010733275.1, entitled "METHOD AND APPARATUS FOR DETERMINING TARGET RESOURCE TYPE, AND COMMUNICATION DEVICE" and filed with the China National Intellectual Property Administration on Jul. 27, 2020, which are incorporated herein by reference in their entireties.

TECHNICAL FIELD

Embodiments of this application relate to the field of communications, and in particular, to a method and apparatus for determining a target resource type, and a communication device.

BACKGROUND

In a new radio (NR) system, integrated access backhaul (IAB) may provide coverage extension for an NR cell and may further provide capacity improvement for the NR cell, where an access node supporting wireless access of user equipment (UE, which may also be referred to as a terminal device) and performing data wireless backhaul is referred to as an IAB node (IABN). Data is transmitted between the UE and the access node through a wireless access link, and data may be transmitted between access nodes through a wireless backhaul link.

In an IAB network architecture supporting separate deployment of central units (CU)/distributed units (DU), an IAB node may include a DU function part and a mobile termination (MT) function part. Depending on the MT function part, one access node (IABN) may find one parent IABN (P-IABN), and establish a wireless backhaul link with a DU of the parent IABN. After a complete backhaul link has been established for one IAB node, the IAB node turns on the function of a DU of the IAB node, and the DU may provide a cell service, namely, the DU may provide a network access service for the UE.

In an IAB system, a child IAB node receives control information from a parent IAB node/parent node, and the control information may be used for indicating a resource type of an IAB DU cell. In a case that the IAB node is controlled by a plurality of parent IAB nodes, for example, the IAB node establish dual connectivity with two parent nodes, where the IAB node is connected to a parent node 1 through a master cell group (MCG) and is connected to a parent node 2 through a secondary cell group (SCG). In this case, the IAB node may receive control information from different parent IAB nodes, and the control information sent by the different parent IAB nodes to the IAB node may be different, leading to an understanding error on the resource type of the IAB DU cell and affecting the transmission reliability and validity.

SUMMARY

According to a first aspect of the present disclosure, a method for determining a target resource type is provided, performed by a child IAB node and including: in a case of being connected to at least two parent IAB nodes, determining the target resource type according to resource type indication information received from at least one of the parent IAB nodes.

According to a second aspect of the present disclosure, a method for determining a target resource type is provided, performed by a parent IAB node or a central unit CU and including: sending resource type indication information to a child IAB node connected to at least two parent IAB nodes, where the resource type indication information is used for determining resource type indication information of the target resource type.

According to a third aspect of the present disclosure, an apparatus for determining a target resource type is provided, including: a determining module, configured to: in a case of being connected to at least two parent IAB nodes, determine the target resource type according to resource type indication information received from at least one of the parent IAB nodes.

According to a fourth aspect of the present disclosure, an apparatus for determining a target resource type is provided, including: a processing module, configured to send resource type indication information to a child IAB node connected to at least two parent IAB nodes, where the resource type indication information is used for determining resource type indication information of the target resource type.

According to a fifth aspect of the present disclosure, a communication device is provided, including a processor, a memory, and a program or instruction stored on the memory and executable on the processor, where when the program or instruction is executed by the processor, the steps of the method according to the first aspect or the second aspect are implemented.

According to a sixth aspect of the present disclosure, an embodiment of this application provides a readable storage medium, storing a program or instruction, where when the program or instruction is executed by a processor, the steps of the method according to the first aspect or the second aspect are implemented.

According to a seventh aspect of the present disclosure, an embodiment of this application provides a program product, stored in a non-volatile storage medium, where when the program product is executed by at least one processor, the steps of the method according to the first aspect or the second aspect are implemented.

According to an eighth aspect of the present disclosure, an embodiment of this application provides a chip, including a processor and a communication interface, where the communication interface is coupled to the processor, and the processor is configured to execute a program or instruction to implement the steps of the method according to the first aspect or the second aspect.

BRIEF DESCRIPTION OF THE DRAWINGS

The accompanying drawings described herein are used for providing a further understanding of this application, and form a part of this application. Exemplary embodiments of this application and the description of the embodiments are used for explaining this application and do not constitute any inappropriate limitation to this application. In the accompanying drawings:

FIG. 2 is a schematic flowchart of a method for determining a target resource type according to an embodiment of this application;

FIG. 3 is a schematic flowchart of a method for determining a target resource type according to an embodiment of this application;

FIG. 4 is a schematic flowchart of a method for determining a target resource type according to an embodiment of this application;

FIG. 5 is a schematic flowchart of a method for determining a target resource type according to an embodiment of this application;

DETAILED DESCRIPTION

The following clearly describes the technical solutions in the embodiments of this application with reference to the accompanying drawings in the embodiments of this application. Apparently, the described embodiments are some embodiments of this application rather than all of the embodiments. All other embodiments obtained by a person of ordinary skill in the art based on the embodiments of this application without creative efforts shall fall within the protection scope of this application.

In this specification and claims of this application, the terms "first", "second", and the like are intended to distinguish between similar objects but do not indicate a particular order or sequence. It should be understood that the data termed in such a way are interchangeable in proper circumstances, so that the embodiments of this application described herein can be implemented in other orders than the order illustrated or described herein. In addition, in this specification and the claims, "and/or" represents at least one of connected objects, and the character "/" generally indicates an "or" relationship between associated objects.

It should be noted that, the technologies described in the embodiments of this application are not limited to a long term evolution (LTE)/LTE-advanced (LTE-A) system, and may further be applied to other wireless communication systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and other systems. The terms "system" and "network" in the embodiments of this application may generally be used interchangeably. The technologies described in this application may be applied to the systems and wireless technologies mentioned above, and may also be applied to other systems and wireless technologies. However, the following describes a new radio (NR) system for the purpose of illustration, and NR terms are used in most of the following descriptions, although the technologies may also be applied to applications other than NR system applications, such as a 6th generation (6G) communication system.

Figure 1:
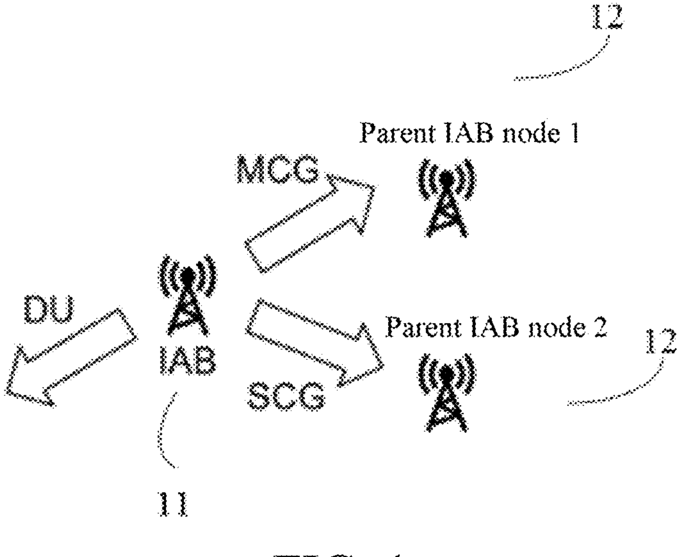
FIG. 1 is a block diagram of a wireless communication system to which an embodiment of this application may be applied.

FIG. 1 is a block diagram of a wireless communication system to which an embodiment of this application may be applied. The wireless communication system includes a child IAB node 11 and two parent IAB nodes 12 (Parent1 and Parent2). The child IAB node 11 may be a base station, a core network device, or a terminal. The terminal may also be referred to as a terminal device or user equipment (UE), and the terminal may be a network-side device such as a mobile phone, a tablet personal computer, a laptop computer or a notebook computer, a personal digital assistant (PDA), a palmtop computer, a netbook, an ultra-mobile personal computer (UMPC), a mobile Internet device (MID), a wearable device or vehicle user equipment (VUE), pedestrian user equipment (PUE). The wearable device includes: a bracelet, an earphone, or glasses. It should be noted that, a specific type of the terminal is not limited in the embodiments of this application. The parent IAB node 12 may be a base station or a core network. The base station may be referred to as a NodeB, an evolved NodeB, an access point, a base transceiver station (BTS), a radio base station, a radio transceiver, a basic service set (BSS), an extended service set (ESS), a B node, an evolved B node (eNB), a home B node, a home evolved B node, a WLAN access point, a Wi-Fi node, a transmitting receiving point (TRP), or any suitable term in the field, provided that a same technical effect can be reached, and the base station is not limited to a specific technical term. It should be noted that, the base station in the NR system is only used as an example in the embodiments of this application, but a specific type of the base station is not limited.

The following describes a method for determining a target resource type provided in the embodiments of this application in detail through specific embodiments and application scenarios thereof with reference to the accompanying drawings.

As shown in FIG. 2, an embodiment of this application provides a method 200 for determining a target resource type, and the method may be performed by a child IAB node. In other words, the method may be performed by software or hardware installed on the child IAB node, and the method includes the following step:

S202: In a case of being connected to at least two parent IAB nodes, determine the target resource type according to resource type indication information received from at least one of the parent IAB nodes.

In a case that the child IAB node is connected to at least two parent IAB nodes (for example, the Parent1 and Parent2 shown in FIG. 1), resource type indication information from the Parent1 and resource type indication information from the Parent2 may be received, where the resource type indication information is used for indicating the target resource type, for example, a resource type of an IAB DU cell. However, the resource type indication information sent by the Parent1 and Parent2 may be different, and to avoid misunderstanding of the child IAB node on the resource type, in this step, the target resource type is determined according to the resource type indication information received from at least one of the parent IAB nodes.

As shown in FIG. 3, an embodiment of this application provides a method 300 for determining a target resource type, and the method may be performed by a child IAB node. In other words, the method may be performed by software or hardware installed on the child IAB node, and the method includes the following step:

S302: In a case of being connected to at least two parent IAB nodes, process the resource type indication information received from at least one of the at least two parent IAB nodes according to a preset processing rule to determine the target resource type.

This step may include the following various implementations.

In a first implementation, one target parent IAB node may be determined from the at least two parent IAB nodes; and the target resource type is determined according to resource type indication information sent by the target parent IAB node. The child IAB node receives or follows indication information of only one parent node (for example, MCD cell/SCG cell), and does not receive or follow indication information of other parent nodes. Therefore, misunderstanding of the child IAB node on the resource type is avoided in a case that different indication information is transmitted by a plurality of parent nodes, and the transmission performance is ensured.

Optionally, the target parent IAB node is preset, for example, agreed by a communication protocol or configured by a network device. For example, the child IAB node only receives/follows indication information from an MCG.

In a second implementation, the resource type indication information is determined as valid in a case that resource types indicated by the resource type indication information for a same resource are the same.

In a case that the child IAB node considers indication information of a plurality of parent nodes simultaneously, for a resource whose resource type needs to be indicated, only when resource types indicated by all indication information for the resource received from the plurality of parent nodes are the same, the indication information is valid; or otherwise, the indication information is invalid. Optionally, the plurality of parent nodes are all or part of parent nodes that can indicate the resource type of the resource. For example, in a case that a downlink control information (DCI) format 2_5 indicates that a type of a DU soft resource is hard/NA, only when indication information received from all parent nodes (all parent nodes that can indicate the type of the DU soft resource) connected to the child IAB node indicates that the type of the DU soft resource is hard, the IAB node considers that the type of the DU soft resource is hard/NA.

In a third implementation, a logical operation is performed on values of all resource type indication information for a same resource, and whether the same resource belongs to the target resource type is determined according to a result of the logical operation, where the logical operation includes at least one of the following: a logical AND operation, a logical OR operation, or an exclusive OR operation. The resource type indication information is binary information. For example, for resource indication of a soft type, the soft type may be indicated as 'available' or 'unavailable', where 'available' may be regarded as '1', and 'unavailable' may be regarded as '0'. Therefore, in a case that the result of the logical operation is 0, it may be determined that the same resource does not belong to the target resource type; and in a case that the result of the logical operation is 1, it may be determined that the same resource belongs to the target resource type.

In a fourth implementation, in a case that at least two pieces of resource type indication information are received and valid moments of the at least two pieces of resource type indication information overlap with each other, a resource not encountering an indication conflict in resources indicated by the indication information whose valid moments overlap with each other is determined as a first target resource while a resource encountering an indication conflict is ignored, and a target resource type corresponding to the first target resource is determined according to the resource type indication information. Optionally, the indication conflict may include a case that resource types indicated by the indication information are different.

In a fifth implementation, in a case that at least two pieces of resource type indication information are received and valid moments of the at least two pieces of resource type indication information overlap with each other, a resource encountering an indication conflict in resources indicated by the indication information whose valid moments overlap with each other is determined as a second target resource, and a target resource type corresponding to the second target resource is determined according to priorities of the at least two pieces of resource type indication information. Optionally, the indication conflict may include a case that resource types indicated by the indication information are different.

Optionally, determination of the priority of each resource type indication information includes at least one of the following:

The priority of the resource type indication information is determined according to a type of a cell receiving the resource type indication information. For example, available resource indication from a PCell is prior; and available resource indication from an MCG is prior.

The priority of the resource type indication information is determined according to the resource type indication information. Priority values are indicated by an MCG/SCG cell in a PDCCH, and priorities of a plurality of pieces of available resource indication received by the IAB node are compared through the priority values. In a case that the priorities of the plurality of pieces of available resource indication are the same, the priorities may be determined according to a predetermined priority sequence. For example, available resource indication from a PCell is prior; and available resource indication from an MCG is prior.

The priority of the resource type indication information is determined according to a preset rule. For example, a priority sequence of commands from an SCG cell or an MCG cell is defined by a protocol or configured by a CU. For example, the priorities of the commands are autonomously determined by the child IAB node.

In addition, the determining the priority of the resource type indication information according to a preset rule may further include: determining the priority of the resource type indication information according to at least one of radio channel quality, an amount of resources, or an amount of transmittable data. For conflicting resources, according to the radio channel quality, the IAB node preferentially uses a resource with good radio channel quality and discards a resource with relatively poor radio channel quality and conflicting with the resource with good radio channel quality. According to the amount of resources such as a bandwidth of a carrier or a BWP, a resource with a large bandwidth is preferentially used while a resource with a narrow bandwidth is discarded in corresponding available resources. According to the amount of transmittable data, data transmission parameters may be determined for conflicting resources. For example, the amount of transmittable data may be determined through rank, MCS, the number of PRBs, the number of OFDMs, and position overheads, and the priority is determined by comparing the amount of transmittable data.

In a sixth implementation, in a case that the resource type indication information received from one of the at least two parent IAB nodes conflicts with scheduling information received from another of the at least two parent IAB nodes at a third target resource, a resource type of the third target resource is determined according to the resource type indication information or the scheduling information.

For example, for resources of an IAB DU serving cell, the IAB nodes receives a command indicating that the resources are available from an MCG cell, but some resources indicated as available have a reuse conflict (for example, resource overlap) with resources scheduled to an IAB MB on an SCG link. In this case, the MT performs the following actions: The IAB MT still uses resources scheduled from the parent IAB node for transmission and ignores resources available to the DU; or the IAB MT discards resources available to the DU.

Therefore, in the embodiments of this application, the resource type indication information received from at least one of the at least two parent IAB nodes is processed according to a preset processing rule to determine the target resource type, so that the target resource type can be determined, misunderstanding of the child IAB node on the resource type can be avoided, and the transmission performance can be ensured.

As shown in FIG. 4, an embodiment of this application provides a method 400 for determining a target resource type, and the method may be performed by a child IAB node. In other words, the method may be performed by software or hardware installed on the child IAB node, and the method includes the following step:

S402: In a case of being connected to at least two parent IAB nodes, determine the target resource type according to a first configuration manner of resource types and the resource type indication information.

In the first configuration manner of the resource types, configured objects of the resource types are a first configured object and a second configured object, where the first configured object is a mobile termination cell MT cell or a termination cell group MT cell group, and the second configured object is a distributed unit cell DU cell corresponding to the mobile termination cell MT cell or the mobile termination cell group MT cell group. For example, an IAB resource type is configured with a {Du cell, MT cell} pair, so that the DU cell can determine a corresponding MT cell.

Resource type configuration information of the DU cell may be at least exchanged through first target information transmitted between central units CUs. At least serving cell configurations and/or serving cell resource type configurations of a DU under management of the CUs are exchanged. Optionally, the information exchange at least needs to be performed when a same DU is connected to different CUs.

Through this step, it may be ensured that different MT cells separately corresponds to one DU cell, and signaling received by an MT cell only acts on a corresponding DU cell. In a case that resources of DU cells corresponding to different MT cells do not overlap with each other or meet a configuration limitation, misunderstanding of an IAB node on an IAB DU cell resource type may be avoided.

As shown in FIG. 5, an embodiment of this application provides a method 500 for determining a target resource type, and the method may be performed by a child IAB node. In other words, the method may be performed by software or hardware installed on the child IAB node, and the method includes the following step:

S502: In a case of being connected to at least two parent IAB nodes, determine the target resource type based on the resource type indication information and an obtained limiting condition.

This step may include the following implementations:

In a first implementation, through higher layer signaling, resources of a DU serving cell of an IAB node are configured not to overlap with resources of an IAB MT serving cell belonging to a different cell group or a DU serving cell of a different parent IAB node.

Alternatively, through a limitation on a high layer configuration (for example, a limitation on an F1-AP/RRC signaling configuration), resources of one IAB DU serving cell cannot overlap with resources of an IAB MT serving cell belonging to a different cell group or a DU serving cell of a different Parent node. In other words, resources of one IAB DU serving cell can at most overlap with resources of an IAB MT serving cell belonging to a same cell group/a DU serving cell of a same Parent node.

Figures 6A, 6B, 7:
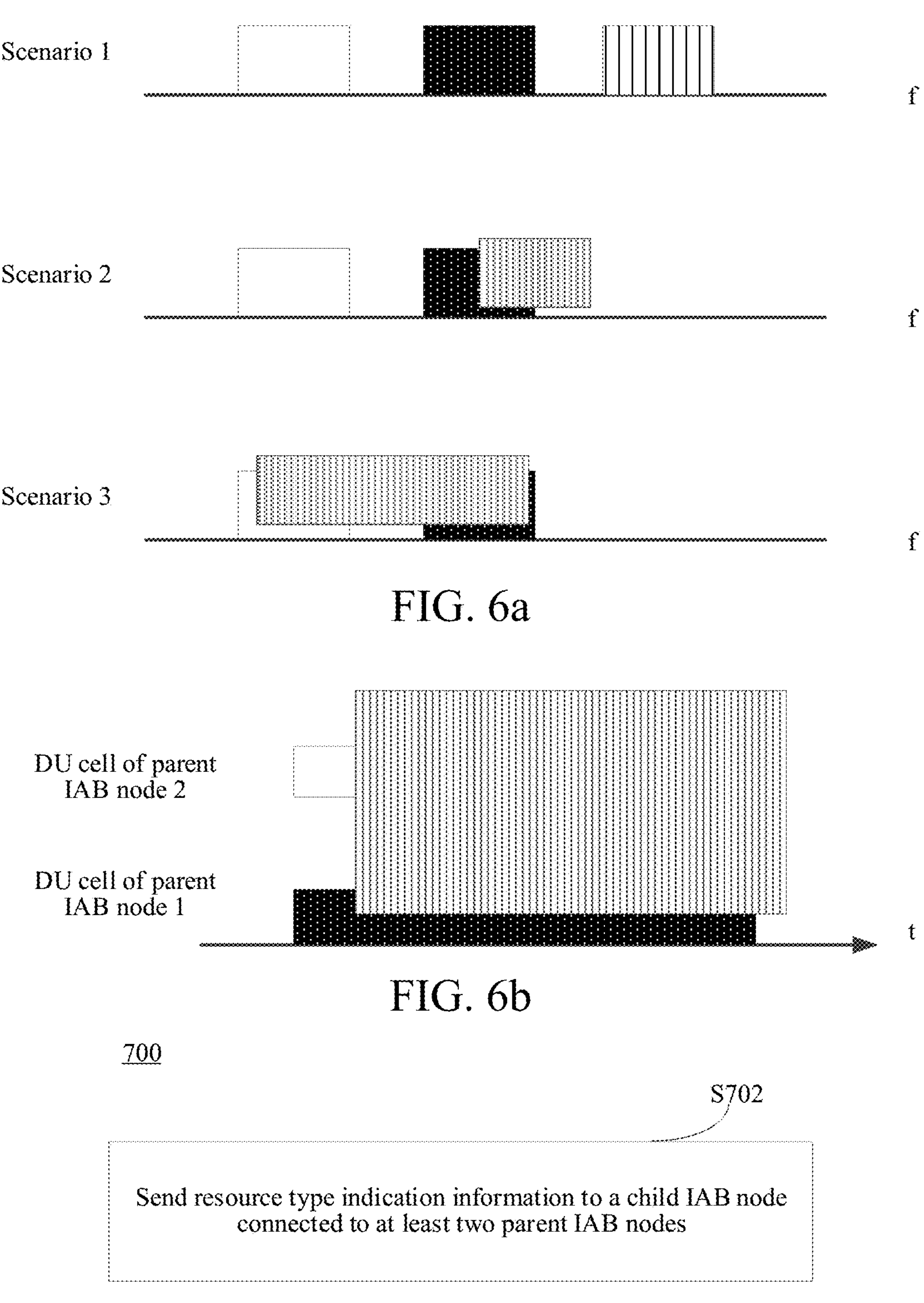
FIG. 6*a* to FIG. 6*b* show schematic diagrams of an instance according to an embodiment of this application.
FIG. 7 is a schematic flowchart of a method for determining a target resource type according to an embodiment of this application.

An instance is provided below for description:

FIG. 6*a* shows a schematic diagram of an instance according to an embodiment of this application. The figure shows a band occupied by an MT cell group 1 (CG 1) and a band occupied by an MT cell group 2 (CG 2), and bands occupied by the CG 1 and the CG 2 do not overlap with each other. Frequency domain resources occupied by a DU cell (CG 0) may not overlap with those occupied by the CG 1 and the CG 2 (scenario 1); or frequency domain resources occupied by the CG 0 overlap with those occupied by one of the CG 1 and the CG 2 (scenario 2). However, the frequency domain resources occupied by the CG 0 cannot overlap with resources occupied by both the CG 1 and the CG 2 (scenario 3), namely, the scenario 3 is not permitted in this step.

The overlap includes time domain and/or frequency domain resource overlap, and the overlap includes that a frequency domain resource isolation degree/gap is less than a value (or, in a time domain resource overlap part, a frequency domain resource isolation degree/gap is less than a value).

In a second implementation, in a case that resources of a DU serving cell of an IAB node overlap with resources of an IAB MT serving cell belonging to a different cell group or a DU serving cell of a different parent IAB node, a resource type configuration is configured through higher layer signaling to meet the following resource type configuration condition:

the resource type configuration condition includes: in a case that the DU serving cell of the IAB node is configured as a soft type at a target moment, at most one resource type among resource types of DU serving cells of different parent IAB nodes is configured as a target type at the target moment, and the target type is at least one of the following: a Hard type, a Soft type, or a non-NA type.

An instance is provided below for description:

FIG. 6*b* shows a schematic diagram of another instance according to an embodiment of this application. In a case that a type of an IAB DU cell is configured as Soft, one of a parent node 1 and a parent node 2 may set a type of a DU cell thereof to Hard/Soft. For example, the parent node 2 may set a type of a DU cell thereof to Hard/Soft, and the other of the parent node 1 and the parent node 2 sets a type of a DU cell thereof to NA, namely, the parent node 1 may set the type of the DU cell thereof to NA.

Optionally, resource type configuration information of the DU cell may be at least exchanged through second target information transmitted between central units. The information exchange at least needs to be performed when a same DU is connected to different CUs.

In addition, in a case that the resource type configuration does not meet the resource type configuration limitation, an error may be reported to a central unit or at least one of the parent IAB nodes.

In a third implementation, target resource types corresponding to the resource type indication information are caused not to conflict with each other through at least one of the following preset indication limitations:

Preset indication limitation 1: Resource type indication information is received only from one of the parent IAB nodes through a mobile termination MT. In other words, the IAB MT does not expect to receive resource type indication from different parent nodes.

Preset indication limitation 2: In a case that resource type indication information is received from at least two of the parent IAB nodes through a mobile termination MT, the at least two pieces of resource type indication information correspond to different distributed unit cells. In other words, in a case that the IAB MT receives resource type indication from different parent nodes, the IAB MT does not expect the resource type indication to act on a same DU cell.

Preset indication limitation 3: In a case that resource type indication information is received from at least two of the parent IAB nodes through a mobile termination MT, valid times of the resource type indication information do not overlap with each other. In other words, in a case that the IAB MT receives resource type indication from different parent nodes, the IAB MT does not expect the valid times of the indication to overlap with each other.

Preset indication limitation 4: In a case that resource type indication information is received from at least two of the parent IAB nodes through a mobile termination MT and the resource type indication information corresponds to a same distributed unit cell, valid times of the resource type indication information do not overlap with each other. In other words, in a case that the IAB MT receives resource type indication from different parent nodes and the resource type indication acts on a same DU cell, the IAB MT does not expect the valid times of the indication to overlap with each other.

Preset indication limitation 6: In a case that resource type indication information is received from at least two of the parent IAB nodes through a mobile termination MT and valid times of the at least two pieces of resource type indication information overlap with each other, the at least two pieces of resource type indication information do not conflict with each other. In other words, in a case that the IAB MT receives resource type indication from different parent nodes and valid times of the indication overlap with each other, the IAB MT does not expect content of the indication to be different.

Preset indication limitation 7: In a case that resource type indication information is received from at least two of the parent IAB nodes through a mobile termination MT, the resource type indication information corresponds to a same distributed unit cell, and valid times of the at least two pieces of resource type indication information overlap with each other, the at least two pieces of resource type indication information do not conflict with each other. In other words, in a case that the IAB MT receives resource type indication from different parent nodes, the resource type indication acts on a same DU cell, and valid times of the indication overlap with each other, the IAB MT does not expect content of the indication to be different.

In this step, MAC CE or DCI indication may be limited.

Optionally, in a case that the resource type configuration does not meet the resource type configuration condition, a resource configuration does not meet a limitation on the resource configuration, or resource type indication does not meet the indication limitation, an error is reported to a central unit or at least one of the parent IAB nodes or central units CUs.

The foregoing describes methods for determining a target resource type according to the embodiments of this application in detail with reference to FIG. 1 to FIG. 5. The following describes a method for determining a target resource type according to another embodiment of this application in detail with reference to FIG. 7. It may be understood that, interaction between the network device and the terminal device described from the network device side and the description from the terminal device side in the method shown in FIG. 1 to FIG. 5 are the same, and to avoid repetition, related description is appropriately omitted.

FIG. 7 is a schematic diagram of an implementation procedure of a method 700 for determining a target resource type according to an embodiment of this application, and the method may be performed by a parent IAB node or a central unit CU. In other words, the method may be performed by software or hardware installed on the parent IAB node or the central unit CU, and the method includes the following step:

S702: Send resource type indication information to a child IAB node connected to at least two parent IAB nodes.

The resource type indication information is used for determining resource type indication information of the target resource type.

That the resource type indication information is used for determining resource type indication information of the target resource type includes at least one of the following:

Implementation 1: Determining the target resource type according to a first configuration manner of resource types in the resource type indication information, where in the first configuration manner of the resource types, configured objects of the resource types are a first configured object and a second configured object, where the first configured object is a mobile termination cell MT cell or a termination cell group MT cell group, and the second configured object is a distributed unit cell DU cell corresponding to the mobile termination cell MT cell or the mobile termination cell group MT cell group.

Optionally, resource type configuration information of the DU cell may be at least exchanged through first target information transmitted between central units CUs. Description of this implementation may be similar to related description of the embodiment of FIG. 4, and details are not described herein again.

Implementation 2: Determining the target resource type based on the resource type indication information and an obtained limiting condition, to cause resource type indication information from different parent IAB nodes not to conflict with each other.

In an implementation, in a case that resources of a DU serving cell of an IAB node overlap with resources of a DU serving cell of a different parent IAB node, a resource type configuration may be configured through higher layer signaling to meet the following resource type configuration condition:

the resource type configuration condition includes: in a case that the DU serving cell of the IAB node is configured as a soft type at a target moment, at most one resource type among resource types of DU serving cells of different parent IAB nodes is configured as a target type at the target moment, and the target type is at least one of the following: a Hard type, a Soft type, or a non-NA type.

In an implementation, resource type configuration information of the DU cell may be at least exchanged through second target information transmitted between central units.

In an implementation, the determining the target resource type based on the resource type indication information and an obtained limiting condition, to cause resource type indication information from different parent IAB nodes not to conflict with each other includes: causing target resource types corresponding to the resource type indication information not to conflict with each other through at least one of the following preset indication limitations:

- resource type indication information is received only from one of the parent IAB nodes through a mobile termination MT;
- in a case that resource type indication information is received from at least two of the parent IAB nodes through a mobile termination MT, the at least two pieces of resource type indication information correspond to different distributed unit cells;
- in a case that resource type indication information is received from at least two of the parent IAB nodes through a mobile termination MT, valid times of the resource type indication information do not overlap with each other;
- in a case that resource type indication information is received from at least two of the parent IAB nodes through a mobile termination MT and the resource type indication information corresponds to a same distributed unit cell, valid times of the resource type indication information do not overlap with each other;
- in a case that resource type indication information is received from at least two of the parent IAB nodes through a mobile termination MT and valid times of the at least two pieces of resource type indication information overlap with each other, the at least two pieces of resource type indication information do not conflict with each other; or
- in a case that resource type indication information is received from at least two of the parent IAB nodes through a mobile termination MT, the resource type indication information corresponds to a same distributed unit cell, and valid times of the at least two pieces of resource type indication information overlap with each other, the at least two pieces of resource type indication information do not conflict with each other.

In an implementation, the method may further include: receiving error information, where the error information is sent by the child IAB node connected to two parent IAB nodes in a case that the resource type configuration does not meet the resource type configuration condition, or a resource configuration does not meet a limitation on the resource configuration, or resource type indication does not meet the indication limitation.

Description of this implementation may be similar to related description of the embodiment of FIG. 5, and details are not described herein again.

Implementation 3: Transmitting second information with other parent IAB nodes before sending the resource type indication information to determine the target resource type, to cause resource type indication information from different parent IAB nodes not to conflict with each other.

This implementation may be implemented by using the following several optional solutions:

- Optional solution 1: Exchanging the resource type indication information with other parent IAB nodes, to cause different parent IAB nodes to have the same resource type indication information.
- Optional solution 2: Sending the resource type indication information to other parent IAB nodes in a case of receiving reported indication, for example, in a case that a node receives reported indication sent by the other parent IAB nodes, to cause different parent IAB nodes to have the same resource type indication information.
- Optional solution 3: Exchanging the resource type indication information with other parent IAB nodes, to cause only one of the parent IAB nodes to send the resource type indication information to the child IAB node.
- Optional solution 4: Sending the resource type indication information to other parent IAB nodes in a case of receiving reported indication, to cause only one of the parent IAB nodes to send the resource type indication information to the child IAB node.

Therefore, before the resource type indication information is sent through Implementation 3, second information is transmitted with other parent IAB nodes to determine the target resource type, to cause resource type indication information from different parent IAB nodes not to conflict with each other. As a result, the target resource type can be determined, misunderstanding of the child IAB node on the resource type can be avoided, and the transmission performance can be ensured.

It should be noted that, an execution entity of the method for determining a target resource type provided in the embodiments of this application may be an apparatus for determining a target resource type or a control module configured to perform and load the method in the apparatus. In the embodiments of this application, the method for determining a target resource type provided in the embodiments of this application is described by using an example in which the method for determining a target resource type is performed and loaded by the apparatus for determining a target resource type.

Figure 8:
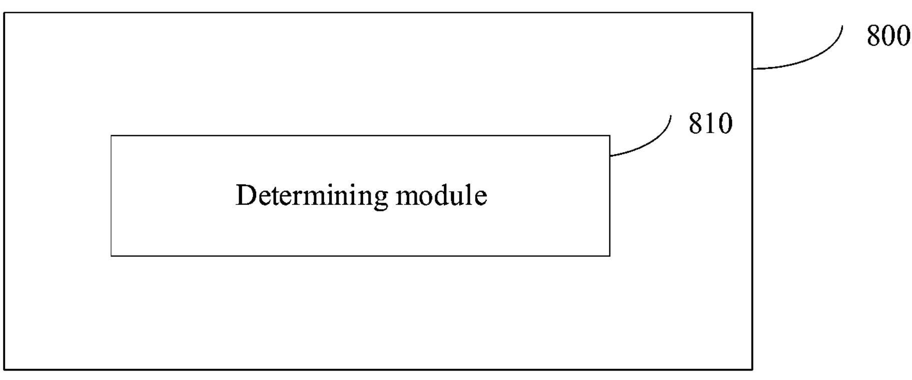
FIG. 8 is a schematic structural diagram of an apparatus for determining a target resource type according to an embodiment of this application.

FIG. 8 is a schematic structural diagram of an apparatus for determining a target resource type according to an embodiment of this application. As shown in FIG. 8, the apparatus 800 for determining a target resource type includes: a determining module 810.

The determining module 810 is configured to: in a case of being connected to at least two parent IAB nodes, determine a target resource type according to resource type indication information received from at least one of the parent IAB nodes.

In an implementation, the determining module 810 is configured to perform at least one of the following: processing the resource type indication information received from at least one of the at least two parent IAB nodes according to a preset processing rule to determine the target resource type; determining the target resource type according to a first configuration manner of resource types and the resource type indication information, where in the first configuration manner of the resource types, configured objects of the resource types are a first configured object and a second configured object, where the first configured object is a mobile termination cell MT cell or a termination cell group MT cell group, and the second configured object is a distributed unit cell DU cell corresponding to the mobile termination cell MT cell or the mobile termination cell group MT cell group; or determining the target resource type based on the resource type indication information and an obtained limiting condition, to cause resource type indication information from different parent IAB nodes not to conflict with each other.

In an implementation, the determining module 810 is configured to: determine one target parent IAB node from the at least two parent IAB nodes; and determine the target resource type according to resource type indication information sent by the target parent IAB node.

In an implementation, the target parent IAB node is preset, or configured by a network device.

In an implementation, the determining module 810 is configured to: determine the resource type indication information as valid in a case that resource types indicated by the resource type indication information for a same resource are the same.

In an implementation, the determining module 810 is configured to: perform a logical operation on values of all resource type indication information for a same resource, and determine whether the same resource belongs to the target resource type according to a result of the logical operation, where the logical operation includes at least one of the following: a logical AND operation, a logical OR operation, or an exclusive OR operation.

In an implementation, the determining module 810 is configured to: in a case that at least two pieces of resource type indication information are received and valid moments of the at least two pieces of resource type indication information overlap with each other, determine a resource not encountering an indication conflict in resources indicated by the indication information whose valid moments overlap with each other as a first target resource, and determine a target resource type corresponding to the first target resource according to the resource type indication information.

In an implementation, the determining module 810 is configured to: in a case that at least two pieces of resource type indication information are received and valid moments of the at least two pieces of resource type indication information overlap with each other, determine a resource encountering an indication conflict in resources indicated by the indication information whose valid moments overlap with each other as a second target resource, and determine a target resource type corresponding to the second target resource according to priorities of the at least two pieces of resource type indication information.

In an implementation, determination of the priority of each resource type indication information includes at least one of the following: determining the priority of the resource type indication information according to a type of a cell receiving the resource type indication information; determining the priority of the resource type indication information according to the resource type indication information; or determining the priority of the resource type indication information according to a preset rule.

In an implementation, the determining module 810 is configured to: determine the priority of the resource type indication information according to at least one of radio channel quality, an amount of resources, or an amount of transmittable data.

In an implementation, the determining module 810 is configured to: in a case that the resource type indication information received from one of the at least two parent IAB nodes conflicts with scheduling information received from another of the at least two parent IAB nodes at a third target resource, determine a resource type of the third target resource according to the resource type indication information or the scheduling information.

In an implementation, the determining module 810 is configured to: at least exchange resource type configuration information of the DU cell through first target information transmitted between central units CUs.

In an implementation, the determining module 810 is configured to: configure, through higher layer signaling, resources of a DU serving cell of an IAB node not to overlap with resources of an IAB MT serving cell belonging to a different cell group or a DU serving cell of a different parent IAB node.

In an implementation, the determining module 810 is configured to: in a case that resources of a DU serving cell of an IAB node overlap with resources of an IAB MT serving cell belonging to a different cell group or a DU serving cell of a different parent IAB node, cause a resource type configuration configured through higher layer signaling to meet the following resource type configuration condition: the resource type configuration condition includes: in a case that the DU serving cell of the IAB node is configured as a soft type at a target moment, at most one resource type among resource types of DU serving cells of different parent IAB nodes is configured as a target type at the target moment, and the target type is at least one of the following: a Hard type, a Soft type, or a non-NA type.

In an implementation, resource type configuration information of the DU cell is at least exchanged through second target information transmitted between central units.

In an implementation, the determining module 810 is configured to: cause target resource types corresponding to the resource type indication information not to conflict with each other through at least one of the following preset indication limitations: resource type indication information is received only from one of the parent IAB nodes through a mobile termination MT; in a case that resource type indication information is received from at least two of the parent IAB nodes through a mobile termination MT, the at least two pieces of resource type indication information correspond to different distributed unit cells; in a case that resource type indication information is received from at least two of the parent IAB nodes through a mobile termination MT, valid times of the resource type indication information do not overlap with each other; in a case that resource type indication information is received from at least two of the parent IAB nodes through a mobile termination MT and the resource type indication information corresponds to a same distributed unit cell, valid times of the resource type indication information do not overlap with each other; in a case that resource type indication information is received from at least two of the parent IAB nodes through a mobile termination MT and valid times of the at least two pieces of resource type indication information overlap with each other, the at least two pieces of resource type indication information do not conflict with each other; or in a case that resource type indication information is received from at least two of the parent IAB nodes through a mobile termination MT, the resource type indication information corresponds to a same distributed unit cell, and valid times of the at least two pieces of resource type indication information overlap with each other, the at least two pieces of resource type indication information do not conflict with each other.

In an implementation, the determining module 810 is configured to: in a case that the resource type configuration does not meet the resource type configuration condition, a resource configuration does not meet a limitation on the resource configuration, or resource type indication does not meet the indication limitation, report an error to a central unit or at least one of the parent IAB nodes.

The apparatus for determining a target resource type in the embodiments of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, an in-vehicle electronic device, a wearable device, an ultra-mobile personal computer (ultra-mobile personal computer, UMPC), a netbook, or a personal digital assistant (personal digital assistant, PDA); and the non-mobile electronic device may be a server, a network attached storage (Network Attached Storage, NAS), a personal computer (personal computer, PC), a television (television, TV), a teller machine, or an automated machine, which are not specifically limited in the embodiments of this application.

The apparatus for determining a target resource type in the embodiments of this application may be an apparatus having an operating system. The operating system may be an Android (Android) operating system, may be an ios operating system, or may be another possible operating system, which is not specifically limited in the embodiments of this application.

For the apparatus 800 according to the embodiments of this application, reference may be made to processes of the methods 200 to 500 corresponding to the embodiments of this application. In addition, the units/modules and the operations and/or functions in the apparatus 800 can implement the corresponding processes in the methods 200 to 500 and achieve the same or equivalent technical effects. For brevity, details are not described herein again.

Figure 9:
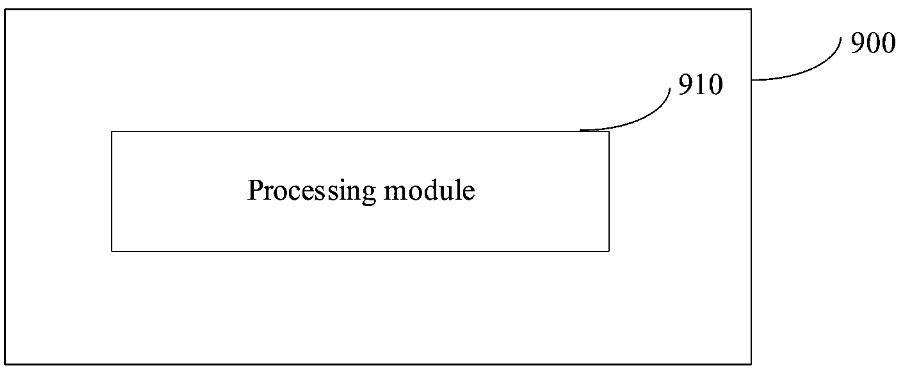
FIG. 9 is a schematic structural diagram of an apparatus for determining a target resource type according to an embodiment of this application.

FIG. 9 is a schematic structural diagram of an apparatus for determining a target resource type according to an embodiment of this application. As shown in FIG. 9, the apparatus 900 for determining a target resource type includes: a processing module 910.

The processing module 910 is configured to send resource type indication information to a child IAB node connected to at least two parent IAB nodes, where the resource type indication information is used for determining resource type indication information of the target resource type.

In an implementation, the processing module 910 is configured to perform at least one of the following:

determining the target resource type according to a first configuration manner of resource types in the resource type indication information, where in the first configuration manner of the resource types, configured objects of the resource types are a first configured object and a second configured object, where the first configured object is a mobile termination cell MT cell or a termination cell group MT cell group, and the second configured object is a distributed unit cell DU cell corresponding to the mobile termination cell MT cell or the mobile termination cell group MT cell group;

determining the target resource type based on the resource type indication information and an obtained limiting condition, to cause resource type indication information from different parent IAB nodes not to conflict with each other; or transmitting second information with other parent IAB nodes before sending the resource type indication information to determine the target resource type, to cause resource type indication information from different parent IAB nodes not to conflict with each other.

In an implementation, the processing module 910 is configured to: at least exchange resource type configuration information of the DU cell through first target information transmitted between central units CUs.

In an implementation, the processing module 910 is configured to: configure, through higher layer signaling, resources of a DU serving cell of an IAB node not to overlap with resources of a DU serving cell of a different parent IAB node.

In an implementation, the processing module 910 is configured to: in a case that resources of a DU serving cell of an IAB node overlap with resources of a DU serving cell of a different parent IAB node, cause a resource type configuration configured through higher layer signaling to meet the following resource type configuration condition:

the resource type configuration condition includes: in a case that the DU serving cell of the IAB node is configured as a soft type at a target moment, at most one resource type among resource types of DU serving cells of different parent IAB nodes is configured as a target type at the target moment, and the target type is at least one of the following: a Hard type, a Soft type, or a non-NA type.

In an implementation, resource type configuration information of the DU cell is at least exchanged through second target information transmitted between central units.

In an implementation, the processing module 910 is configured to: cause target resource types corresponding to the resource type indication information not to conflict with each other through at least one of the following preset indication limitations:

resource type indication information is received only from one of the parent IAB nodes through a mobile termination MT;

in a case that resource type indication information is received from at least two of the parent IAB nodes through a mobile termination MT, the at least two pieces of resource type indication information correspond to different distributed unit cells;

in a case that resource type indication information is received from at least two of the parent IAB nodes through a mobile termination MT, valid times of the resource type indication information do not overlap with each other;

in a case that resource type indication information is received from at least two of the parent IAB nodes through a mobile termination MT and the resource type indication information corresponds to a same distributed unit cell, valid times of the resource type indication information do not overlap with each other;

in a case that resource type indication information is received from at least two of the parent IAB nodes through a mobile termination MT and valid times of the at least two pieces of resource type indication information overlap with each other, the at least two pieces of resource type indication information do not conflict with each other; or in a case that resource type indication information is received from at least two of the parent IAB nodes through a mobile termination MT, the resource type indication information corresponds to a same distributed unit cell, and valid times of the at least two pieces of resource type indication information overlap with each other, the at least two pieces of resource type indication information do not conflict with each other.

In an implementation, the processing module 910 is further configured to: receive error information, where the error information is sent by the child IAB node connected to two parent IAB nodes in a case that the resource type configuration does not meet the resource type configuration condition, or a resource configuration does not meet a limitation on the resource configuration, or resource type indication does not meet the indication limitation.

In an implementation, the processing module 910 is configured to: exchange the resource type indication information with the other parent IAB nodes, or send the resource type indication information to the other parent IAB nodes in a case of receiving reported indication, to cause different parent IAB nodes to have the same resource type indication information, or cause only one of the parent IAB nodes to send the resource type indication information to the child IAB node.

Figure 10:
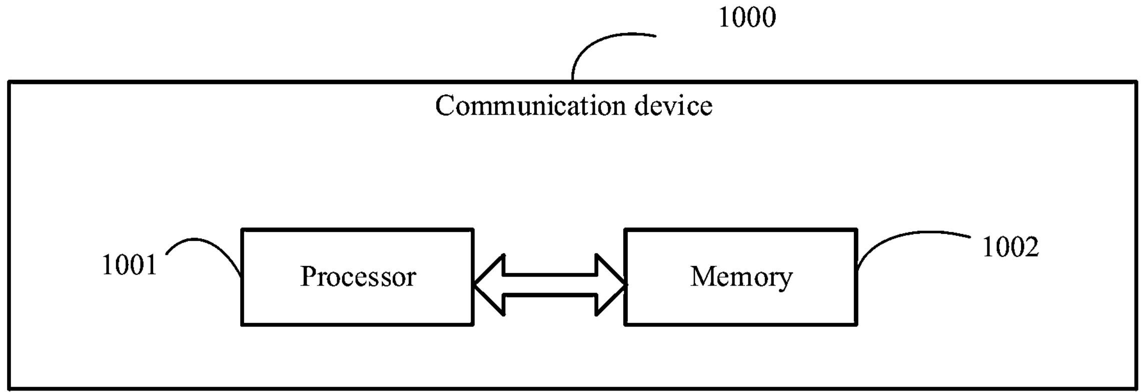
FIG. 10 is a schematic structural diagram of a communication device according to another embodiment of this application.

Optionally, as shown in FIG. 10, an embodiment of this application further provides a communication device 1000, including a processor 1001, a memory 1002, and a program or instruction stored on the memory 1002 and executable on the processor 1001. The communication device 1000 may be a child IAB node or a parent IAB node or a CU in an IAB system. When the communication device 1000 is a terminal, when the program or instruction is executed by the processor 1001, the various processes of the embodiments of the method for determining a target resource type are implemented, and the same technical effects can be achieved. When the communication device 1000 is a network-side device, when the program or instruction is executed by the processor 1001, the various processes of the embodiments of the method for determining a target resource type are implemented, and the same technical effects can be achieved. To avoid repetition, details are not described herein again.

Figure 11:
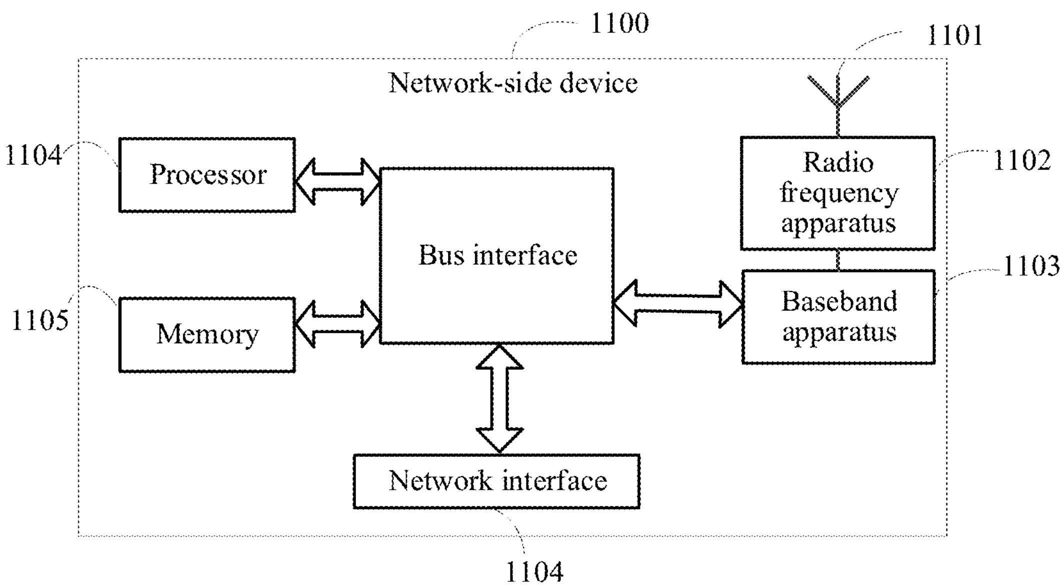
FIG. 11 is a schematic structural diagram of a network device according to another embodiment of this application.

Alternatively, an embodiment of this application further provides a network-side device. The network-side device may be a child IAB node, a parent IAB node, or a CU. As shown in FIG. 11, the network device 1100 includes: an antenna 1101, a radio frequency apparatus 1102, and a baseband apparatus 1103. The antenna 1101 is connected to the radio frequency apparatus 1102. In an uplink direction, the radio frequency apparatus 1102 receives information by using the antenna 1101, and sends the received information to the baseband apparatus 1103 for processing. In a downlink direction, the baseband apparatus 1103 processes information to be sent, and sends the information to the radio frequency apparatus 1102. The radio frequency apparatus 1102 processes the received information and sends the information out by using the antenna 1101.

A band processing apparatus may be located in the baseband apparatus 1103, the method performed by the network-side device in the foregoing embodiment may be implemented in the baseband apparatus 1103, and the baseband apparatus 1103 includes a processor 1104 and a memory 1105.

The baseband apparatus 1103 may include, for example, at least one baseband plate, and a plurality of chips are arranged on the baseband plate. As shown in FIG. 11, one of the plurality of chips is, for example, the processor 1104, and is connected to the memory 1105, to invoke a program in the memory 1105 to perform operations of the network device in the foregoing method embodiments.

The baseband apparatus 1103 may further include a network interface 1106, configured to exchange information with the radio frequency apparatus 1102. The interface is, for example, a common public radio interface (common public radio interface, CPRI).

Alternatively, the network-side device in the embodiments of this application further includes: an instruction or program stored on the memory 1105 and executable on the processor 1104, and the processor 1104 invokes the instruction or program in the memory 1105 to:

in a case of being connected to at least two parent IAB nodes, determine a target resource type according to resource type indication information received from at least one of the parent IAB nodes.

In an implementation, the determining a target resource type according to resource type indication information received from at least one of the parent IAB nodes includes at least one of the following:

processing the resource type indication information received from at least one of the at least two parent IAB nodes according to a preset processing rule to determine the target resource type;

determining the target resource type according to a first configuration manner of resource types and the resource type indication information, where in the first configuration manner of the resource types, configured objects of the resource types are a first configured object and a second configured object, where the first configured object is a mobile termination cell MT cell or a termination cell group MT cell group, and the second configured object is a distributed unit cell DU cell corresponding to the mobile termination cell MT cell or the mobile termination cell group MT cell group; or determining the target resource type based on the resource type indication information and an obtained limiting condition, to cause resource type indication information from different parent IAB nodes not to conflict with each other.

In an implementation, the processing the resource type indication information received from at least one of the at least two parent IAB nodes according to a preset processing rule to determine the target resource type includes:

determining one target parent IAB node from the at least two parent IAB nodes; and determining the target resource type according to resource type indication information sent by the target parent IAB node.

In an implementation, the target parent IAB node is preset, or configured by a network device.

In an implementation, the processing the resource type indication information received from at least one of the at least two parent IAB nodes according to a preset processing rule to determine the target resource type includes:

determining the resource type indication information as valid in a case that resource types indicated by the resource type indication information for a same resource are the same.

In an implementation, the processing the resource type indication information received from at least one of the at least two parent IAB nodes according to a preset processing rule to determine the target resource type includes:

performing a logical operation on values of all resource type indication information for a same resource, and determining whether the same resource belongs to the target resource type according to a result of the logical operation, where the logical operation includes at least one of the following: a logical AND operation, a logical OR operation, or an exclusive OR operation.

In an implementation, the processing the resource type indication information received from at least one of the at least two parent IAB nodes according to a preset processing rule to determine the target resource type includes:

in a case that at least two pieces of resource type indication information are received and valid moments of the at least two pieces of resource type indication information overlap with each other, determining a resource not encountering an indication conflict in resources indicated by the indication information whose valid moments overlap with each other as a first target resource, and determining a target resource type corresponding to the first target resource according to the resource type indication information.

In an implementation, the processing the resource type indication information received from at least one of the at least two parent IAB nodes according to a preset processing rule to determine the target resource type includes:

in a case that at least two pieces of resource type indication information are received and valid moments of the at least two pieces of resource type indication information overlap with each other, determining a resource encountering an indication conflict in resources indicated by the indication information whose valid moments overlap with each other as a second target resource, and determining a target resource type corresponding to the second target resource according to priorities of the at least two pieces of resource type indication information.

In an implementation, determination of the priority of each resource type indication information includes at least one of the following:

determining the priority of the resource type indication information according to a type of a cell receiving the resource type indication information;

determining the priority of the resource type indication information according to the resource type indication information; or determining the priority of the resource type indication information according to a preset rule.

In an implementation, the determining the priority of the resource type indication information according to a preset rule includes:

determining the priority of the resource type indication information according to at least one of radio channel quality, an amount of resources, or an amount of transmittable data.

In an implementation, the processing the resource type indication information received from at least one of the at least two parent IAB nodes according to a preset processing rule to determine the target resource type includes:

in a case that the resource type indication information received from one of the at least two parent IAB nodes conflicts with scheduling information received from another of the at least two parent IAB nodes at a third target resource, determining a resource type of the third target resource according to the resource type indication information or the scheduling information.

In an implementation, the determining the target resource type according to a first configuration manner of resource types and the resource type indication information includes:

at least exchanging resource type configuration information of the DU cell through first target information transmitted between central units CUs.

In an implementation, the determining the target resource type based on the resource type indication information and an obtained limiting condition, to cause resource type indication information from different parent IAB nodes not to conflict with each other includes:

configuring, through higher layer signaling, resources of a DU serving cell of an IAB node not to overlap with resources of an IAB MT serving cell belonging to a different cell group or a DU serving cell of a different parent IAB node.

In an implementation, the determining the target resource type based on the resource type indication information and an obtained limiting condition, to cause resource type indication information from different parent IAB nodes not to conflict with each other includes:

in a case that resources of a DU serving cell of an IAB node overlap with resources of an IAB MT serving cell belonging to a different cell group or a DU serving cell of a different parent IAB node, causing a resource type configuration configured through higher layer signaling to meet the following resource type configuration condition:

the resource type configuration condition includes: in a case that the DU serving cell of the IAB node is configured as a soft type at a target moment, at most one resource type among resource types of DU serving cells of different parent IAB nodes is configured as a target type at the target moment, and the target type is at least one of the following: a Hard type, a Soft type, or a non-NA type.

In an implementation, resource type configuration information of the DU cell is at least exchanged through second target information transmitted between central units.

In an implementation, the determining the target resource type based on the resource type indication information and an obtained limiting condition, to cause resource type indication information from different parent IAB nodes not to conflict with each other includes:

causing target resource types corresponding to the resource type indication information not to conflict with each other through at least one of the following preset indication limitations:

resource type indication information is received only from one of the parent IAB nodes through a mobile termination MT;

in a case that resource type indication information is received from at least two of the parent IAB nodes through a mobile termination MT, the at least two pieces of resource type indication information correspond to different distributed unit cells;

in a case that resource type indication information is received from at least two of the parent IAB nodes through a mobile termination MT, valid times of the resource type indication information do not overlap with each other;

in a case that resource type indication information is received from at least two of the parent IAB nodes through a mobile termination MT and the resource type indication information corresponds to a same distributed unit cell, valid times of the resource type indication information do not overlap with each other;

in a case that resource type indication information is received from at least two of the parent IAB nodes through a mobile termination MT and valid times of the at least two pieces of resource type indication information overlap with each other, the at least two pieces of resource type indication information do not conflict with each other; or in a case that resource type indication information is received from at least two of the parent IAB nodes through a mobile termination MT, the resource type indication information corresponds to a same distributed unit cell, and valid times of the at least two pieces of resource type indication information overlap with each other, the at least two pieces of resource type indication information do not conflict with each other.

In an implementation, in a case that the resource type configuration does not meet the resource type configuration condition, a resource configuration does not meet a limitation on the resource configuration, or resource type indication does not meet the indication limitation, an error is reported to a central unit or at least one of the parent IAB nodes or central units CUs.

Alternatively, the processor 1104 invokes the instruction or program in the memory 1105 to:

send resource type indication information to a child IAB node connected to at least two parent IAB nodes, where the resource type indication information is used for determining resource type indication information of the target resource type.

In an implementation, that the resource type indication information is used for determining resource type indication information of the target resource type includes at least one of the following:

determining the target resource type according to a first configuration manner of resource types in the resource type indication information, where in the first configuration manner of the resource types, configured objects of the resource types are a first configured object and a second configured object, where the first configured object is a mobile termination cell MT cell or a termination cell group MT cell group, and the second configured object is a distributed unit cell DU cell corresponding to the mobile termination cell MT cell or the mobile termination cell group MT cell group;

determining the target resource type based on the resource type indication information and an obtained limiting condition, to cause resource type indication information from different parent IAB nodes not to conflict with each other; or transmitting second information with other parent IAB nodes before sending the resource type indication information to determine the target resource type, to cause resource type indication information from different parent IAB nodes not to conflict with each other.

In an implementation, the determining the target resource type according to a first configuration manner of resource types and the resource type indication information includes:

at least exchanging resource type configuration information of the DU cell through first target information transmitted between central units CUs.

In an implementation, receiving first information to cause resource type indication information from different parent IAB nodes not to conflict with each other includes:

configuring, through higher layer signaling, resources of a DU serving cell of an IAB node not to overlap with resources of a DU serving cell of a different parent IAB node.

In an implementation, receiving first information to cause resource type indication information of different parent IAB nodes not to conflict with each other includes:

in a case that resources of a DU serving cell of an IAB node overlap with resources of a DU serving cell of a different parent IAB node, causing a resource type configuration configured through higher layer signaling to meet the following resource type configuration condition:

the resource type configuration condition includes: in a case that the DU serving cell of the IAB node is configured as a soft type at a target moment, at most one resource type among resource types of DU serving cells of different parent IAB nodes is configured as a target type at the target moment, and the target type is at least one of the following: a Hard type, a Soft type, or a non-NA type.

In an implementation, resource type configuration information of the DU cell is at least exchanged through second target information transmitted between central units.

In an implementation, the determining the target resource type based on the resource type indication information and an obtained limiting condition, to cause resource type indication information from different parent IAB nodes not to conflict with each other includes:

causing target resource types corresponding to the resource type indication information not to conflict with each other through at least one of the following preset indication limitations:

resource type indication information is received only from one of the parent IAB nodes through a mobile termination MT;

in a case that resource type indication information is received from at least two of the parent IAB nodes through a mobile termination MT, the at least two pieces of resource type indication information correspond to different distributed unit cells;

in a case that resource type indication information is received from at least two of the parent IAB nodes through a mobile termination MT, valid times of the resource type indication information do not overlap with each other;

in a case that resource type indication information is received from at least two of the parent IAB nodes through a mobile termination MT and the resource type indication information corresponds to a same distributed unit cell, valid times of the resource type indication information do not overlap with each other;

in a case that resource type indication information is received from at least two of the parent IAB nodes through a mobile termination MT and valid times of the at least two pieces of resource type indication information overlap with each other, the at least two pieces of resource type indication information do not conflict with each other; or in a case that resource type indication information is received from at least two of the parent IAB nodes through a mobile termination MT, the resource type indication information corresponds to a same distributed unit cell, and valid times of the at least two pieces of resource type indication information overlap with each other, the at least two pieces of resource type indication information do not conflict with each other.

In an implementation, the method further includes: receiving error information, where the error information is sent by the child IAB node connected to two parent IAB nodes in a case that the resource type configuration does not meet the resource type configuration condition, or a resource configuration does not meet a limitation on the resource configuration, or resource type indication does not meet the indication limitation.

In an implementation, the transmitting second information with other parent IAB nodes to determine the target resource type, to cause resource type indication information from different parent IAB nodes not to conflict with each other includes: exchanging the resource type indication information with the other parent IAB nodes, or sending the resource type indication information to the other parent IAB nodes in a case of receiving reported indication, to cause different parent IAB nodes to have the same resource type indication information, or cause only one of the parent IAB nodes to send the resource type indication information to the child IAB node.

Specific execution and steps are similar to the description of 200 to 500 and 700 shown in the figures, and the same technical effects can be achieved. To avoid repetition, details are not described herein again.

Figure 12:
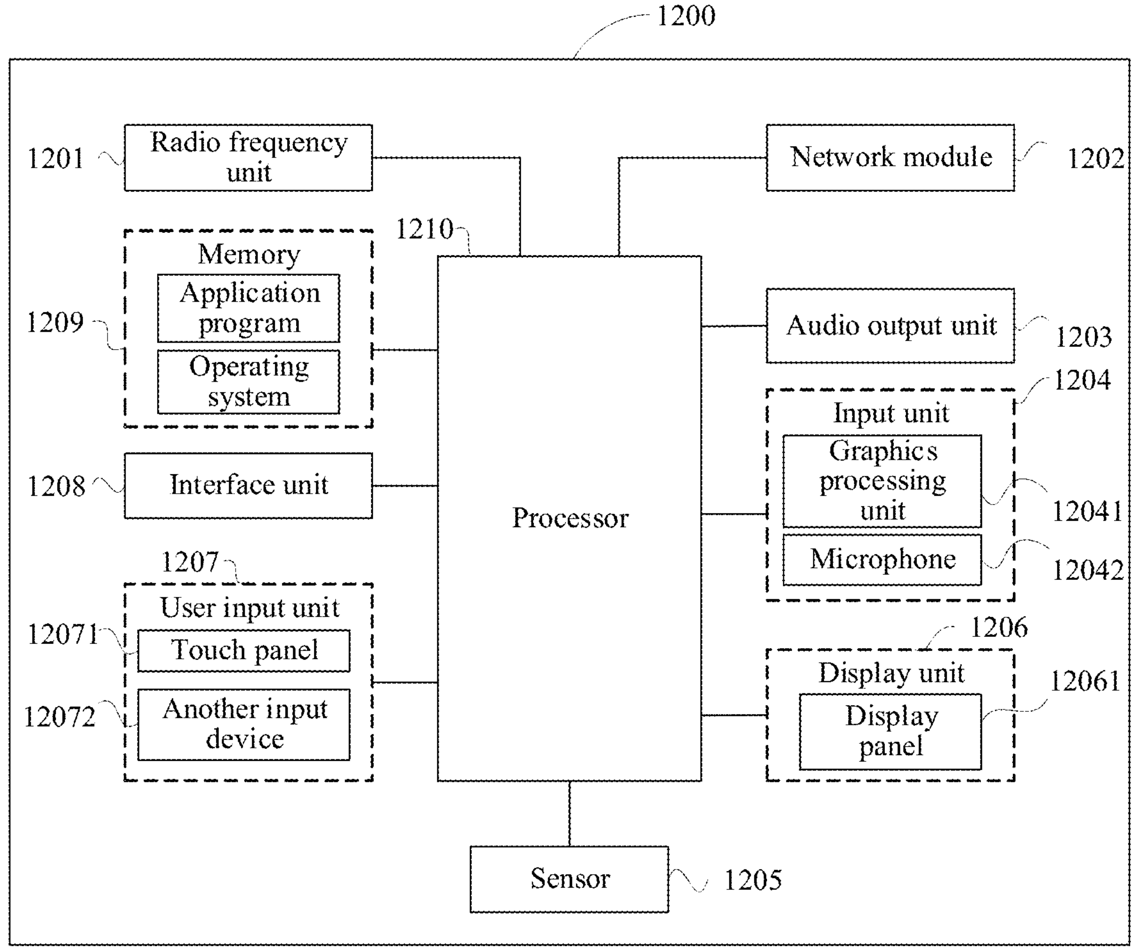
FIG. 12 is a schematic structural diagram of a terminal device according to another embodiment of this application.

FIG. 12 is a schematic diagram of a hardware structure of a terminal device for implementing various embodiments of this application. The child IAB node may be a terminal device. The terminal device 1200 includes, but not limited to, components such as a radio frequency unit 1201, a network module 1202, an audio output unit 1203, an input unit 1204, a sensor 1205, a display unit 1206, a user input unit 1207, an interface unit 1208, a memory 1209, and a processor 1210.

A person skilled in the art may understand that, the terminal device 1200 may further include a power supply (such as a battery) that supplies power to the components. The power supply may be logically connected to the processor 1210 by using a power management system, thereby implementing functions such as charging, discharging, and power consumption management by using the power management system. A terminal device structure shown in FIG. 12 does not constitute a limitation to the terminal device, and the terminal may include more or fewer components than those shown in the figure, or some components may be combined, or a different component deployment may be used, which is not described herein again.

It should be understood that, in the embodiments of this application, the input unit 1204 may include a graphics processing unit (GPU) 12041 and a microphone 12042. The graphics processing unit 12041 performs processing on image data of a static picture or a video that is obtained by an image acquisition device (for example, a camera) in a video acquisition mode or an image acquisition mode. The display unit 1206 may include a display panel 12061, and for example, the display panel 12061 may be configured in a form such as a liquid crystal display or an organic light-emitting diode. The user input unit 1207 includes a touch panel 12071 and another input device 12072. The touch panel 12071 may also be referred to as a touch screen. The touch panel 12071 may include two parts: a touch detection apparatus and a touch controller. The another input device 12072 may include, but not limited to, a physical keyboard, a functional key (such as a volume control key or a switch key), a track ball, a mouse, and a joystick, which are not described herein again.

In the embodiments of this application, after DL data from a network-side device is received, the radio frequency unit 1201 sends the DL data to the processor 1210 for processing. In addition, UL data is sent to the network-side device. Generally, the radio frequency unit 1201 includes, but not limited to, an antenna, at least one amplifier, a transceiver, a coupler, a low noise amplifier, and a duplexer.

The memory 1209 may be configured to store a software program or instruction and various data. The memory 1209 may mainly include a program or instruction storage area and a data storage area. The program or instruction storage area may store an operating system, or an application program or instruction required by at least one function (for example, a sound playing function and an image playing function). In addition, the memory 1209 may include a high-speed random access memory, and may further include a non-volatile memory. The non-volatile memory may be a read-only memory (ROM), a programmable ROM (PROM), an erasable PROM (EPROM), an electrically EPROM (EEPROM), or a flash memory. For example, the non-volatile memory may be at least one magnetic disk storage device, a flash memory device, or other non-volatile solid-state storage devices.

The processor 1210 may include one or more processing units. Optionally, the processor 1210 may integrate an application processor and a modem processor. The application processor mainly processes an operating system, a user interface, and an application program or instruction. The modem processor mainly processes wireless communication, such as a baseband processor. It may be understood that the modem processor may not be integrated into the processor 1210.

The processor 1210 is configured to: in a case of being connected to at least two parent IAB nodes, determine a target resource type according to resource type indication information received from at least one of the parent IAB nodes.

In an implementation, the determining a target resource type according to resource type indication information received from at least one of the parent IAB nodes includes at least one of the following:

processing the resource type indication information received from at least one of the at least two parent IAB nodes according to a preset processing rule to determine the target resource type;

determining the target resource type according to a first configuration manner of resource types and the resource type indication information, where in the first configuration manner of the resource types, configured objects of the resource types are a first configured object and a second configured object, where the first configured object is a mobile termination cell MT cell or a termination cell group MT cell group, and the second configured object is a distributed unit cell DU cell corresponding to the mobile termination cell MT cell or the mobile termination cell group MT cell group; or determining the target resource type based on the resource type indication information and an obtained limiting condition, to cause resource type indication information from different parent IAB nodes not to conflict with each other.

In an implementation, the processing the resource type indication information received from at least one of the at least two parent IAB nodes according to a preset processing rule to determine the target resource type includes:

determining one target parent IAB node from the at least two parent IAB nodes; and determining the target resource type according to resource type indication information sent by the target parent IAB node.

In an implementation, the target parent IAB node is preset, or configured by a network device.

In an implementation, the processing the resource type indication information received from at least one of the at least two parent IAB nodes according to a preset processing rule to determine the target resource type includes:

determining the resource type indication information as valid in a case that resource types indicated by the resource type indication information for a same resource are the same.

In an implementation, the processing the resource type indication information received from at least one of the at least two parent IAB nodes according to a preset processing rule to determine the target resource type includes:

performing a logical operation on values of all resource type indication information for a same resource, and determining whether the same resource belongs to the target resource type according to a result of the logical operation, where the logical operation includes at least one of the following: a logical AND operation, a logical OR operation, or an exclusive OR operation.

In an implementation, the processing the resource type indication information received from at least one of the at least two parent IAB nodes according to a preset processing rule to determine the target resource type includes:

in a case that at least two pieces of resource type indication information are received and valid moments of the at least two pieces of resource type indication information overlap with each other, determining a resource not encountering an indication conflict in resources indicated by the indication information whose valid moments overlap with each other as a first target resource, and determining a target resource type corresponding to the first target resource according to the resource type indication information.

In an implementation, the processing the resource type indication information received from at least one of the at least two parent IAB nodes according to a preset processing rule to determine the target resource type includes:

in a case that at least two pieces of resource type indication information are received and valid moments of the at least two pieces of resource type indication information overlap with each other, determining a resource encountering an indication conflict in resources indicated by the indication information whose valid moments overlap with each other as a second target resource, and determining a target resource type corresponding to the second target resource according to priorities of the at least two pieces of resource type indication information.

In an implementation, determination of the priority of each resource type indication information includes at least one of the following:

determining the priority of the resource type indication information according to a type of a cell receiving the resource type indication information;

determining the priority of the resource type indication information according to the resource type indication information; or determining the priority of the resource type indication information according to a preset rule.

In an implementation, the determining the priority of the resource type indication information according to a preset rule includes:

determining the priority of the resource type indication information according to at least one of radio channel quality, an amount of resources, or an amount of transmittable data.

In an implementation, the processing the resource type indication information received from at least one of the at least two parent IAB nodes according to a preset processing rule to determine the target resource type includes:

in a case that the resource type indication information received from one of the at least two parent IAB nodes conflicts with scheduling information received from another of the at least two parent IAB nodes at a third target resource, determining a resource type of the third target resource according to the resource type indication information or the scheduling information.

In an implementation, the determining the target resource type according to a first configuration manner of resource types and the resource type indication information includes:

at least exchanging resource type configuration information of the DU cell through first target information transmitted between central units CUs.

In an implementation, the determining the target resource type based on the resource type indication information and an obtained limiting condition, to cause resource type indication information from different parent IAB nodes not to conflict with each other includes:

configuring, through higher layer signaling, resources of a DU serving cell of an IAB node not to overlap with resources of an IAB MT serving cell belonging to a different cell group or a DU serving cell of a different parent IAB node.

In an implementation, the determining the target resource type based on the resource type indication information and an obtained limiting condition, to cause resource type indication information from different parent IAB nodes not to conflict with each other includes:

in a case that resources of a DU serving cell of an IAB node overlap with resources of an IAB MT serving cell belonging to a different cell group or a DU serving cell of a different parent IAB node, causing a resource type configuration configured through higher layer signaling to meet the following resource type configuration condition:

the resource type configuration condition includes: in a case that the DU serving cell of the IAB node is configured as a soft type at a target moment, at most one resource type among resource types of DU serving cells of different parent IAB nodes is configured as a target type at the target moment, and the target type is at least one of the following: a Hard type, a Soft type, or a non-NA type.

In an implementation, resource type configuration information of the DU cell is at least exchanged through second target information transmitted between central units.

In an implementation, the determining the target resource type based on the resource type indication information and an obtained limiting condition, to cause resource type indication information from different parent IAB nodes not to conflict with each other includes:

causing target resource types corresponding to the resource type indication information not to conflict with each other through at least one of the following preset indication limitations:

resource type indication information is received only from one of the parent IAB nodes through a mobile termination MT;

in a case that resource type indication information is received from at least two of the parent IAB nodes through a mobile termination MT, the at least two pieces of resource type indication information correspond to different distributed unit cells;

in a case that resource type indication information is received from at least two of the parent IAB nodes through a mobile termination MT, valid times of the resource type indication information do not overlap with each other;

in a case that resource type indication information is received from at least two of the parent IAB nodes through a mobile termination MT and the resource type indication information corresponds to a same distributed unit cell, valid times of the resource type indication information do not overlap with each other;

in a case that resource type indication information is received from at least two of the parent IAB nodes through a mobile termination MT and valid times of the at least two pieces of resource type indication information overlap with each other, the at least two pieces of resource type indication information do not conflict with each other; or in a case that resource type indication information is received from at least two of the parent IAB nodes through a mobile termination MT, the resource type indication information corresponds to a same distributed unit cell, and valid times of the at least two pieces of resource type indication information overlap with each other, the at least two pieces of resource type indication information do not conflict with each other.

In an implementation, in a case that the resource type configuration does not meet the resource type configuration condition, a resource configuration does not meet a limitation on the resource configuration, or resource type indication does not meet the indication limitation, an error is reported to a central unit or at least one of the parent IAB nodes or central units CUs.

For the terminal device 1200 according to the embodiments of this application, reference may be made to processes of the methods 200 to 500 corresponding to the embodiments of this application. In addition, the units/modules and the operations and/or functions in the terminal device 1200 can implement the corresponding processes in the methods 200 to 500 and achieve the same or equivalent technical effects. For brevity, details are not described herein again.

An embodiment of this application further provides a readable storage medium, storing a program or instruction, where when the program or instruction is executed by a processor, the various processes of the embodiments of the method for determining a target resource type are executed, and the same technical effects can be achieved. To avoid repetition, details are not described herein again.

The processor is the processor in the electronic device described in the foregoing embodiments. The readable storage medium includes a computer-readable storage medium such as a computer read-only memory (ROM), a random access memory (RAM), a magnetic disk, or an optical disc.

In addition, an embodiment of this application provides a chip, including a processor and a communication interface, where the communication interface is coupled to the processor, and the processor is configured to execute a program or instruction, to implement the various processes of the embodiments of the method for determining a target resource type and achieve the same technical effects. To avoid repetition, details are not described herein again.

It should be understood that, the chip mentioned in this embodiment of this application may also be referred to as a system-level chip, a system chip, a chip system, or a system on chip.

In addition, an embodiment of this application provides a program product, stored in a non-volatile storage medium where when the program product is executed by at least one processor, the various processes of the embodiments of the method for determining a target resource type are executed, and the same technical effects can be achieved. To avoid repetition, details are not described herein again.

It should be noted that, the terms "include", "comprise", and any variants thereof are intended to cover a non-exclusive inclusion. Therefore, in the context of a process, method, object, or apparatus that includes a series of elements, the process, method, object, or apparatus not only includes such elements, but also includes other elements not clearly listed, or may include inherent elements of the process, method, object, or apparatus. Without more limitations, elements defined by the sentence "including one" does not exclude that there are still other same elements in the process, method, object, or apparatus. In addition, it should be noted that, in the implementations of this application, ranges of the method and apparatus are not limited to those shown in the specification or the functions may be performed according to a discussed order, and the functions may also be performed simultaneously or in a reverse order according to the involved functions. For example, the described method may be performed in a sequence different from the described sequence, and various steps may be further added, omitted, or combined. In addition, features described with reference to some examples may be combined in other examples.

According to the description of the foregoing implementations, a person skilled in the art may clearly understand that the method according to the foregoing embodiments may be implemented by software and a necessary general hardware platform, and certainly, may alternatively be implemented by hardware, but in many cases, the former manner is a better implementation. Based on such an understanding, the technical solutions in this application essentially or the part contributing to the related art may be implemented in the form of a software product. The computer software product is stored in a storage medium (for example, a ROM/RAM, a magnetic disk, or an optical disc), and includes several instructions for instructing a terminal (which may be a mobile phone, a computer, a server, an air conditioner, or a network device) to perform the method described in the embodiments of this application.

The embodiments of this application have been described above with reference to the accompanying drawings. However, this application is not limited to the specific implementations described above, and the specific implementations are merely exemplary and not limitative. A person of ordinary skill in the art may make various forms under the teaching of this application without departing from the concept of this application and the protection scope of the claims, and such forms shall all fall within the protection scope of this application.

What is claimed is:

1. A method for determining a target resource type, performed by a child integrated access backhaul (IAB) node and comprising:

based on being connected to at least two parent IAB nodes, determining the target resource type according to resource type indication information received from at least one of the parent IAB nodes;

wherein the determining the target resource type according to the resource type indication information received from the at least one of the parent IAB nodes comprises:

processing the resource type indication information according to a preset processing rule to determine the target resource type; and determining the target resource type based on the resource type indication information and an obtained limiting condition;

wherein the processing the resource type indication information according to the preset processing rule to determine the target resource type comprises:

based on resource overlap between resources of a child IAB distributed unit (DU), indicated as available by the resource type indication information received from one of the at least two parent IAB nodes, and resources for child IAB mobile termination (MT) transmission, scheduled by scheduling information received from another of the at least two parent IAB nodes, determining a resource type of an overlapping resource according to the scheduling information; and the determining the target resource type based on the resource type indication information and the obtained limiting condition comprises:

in a case that resources of a DU serving cell of an IAB node overlap with resources of an IAB MT serving cell belonging to a different cell group or a DU serving cell of a different parent IAB node, causing a resource type configuration configured through higher layer signaling to meet the following resource type configuration condition:

the resource type configuration condition comprises: in a case that the DU serving cell of the IAB node is configured as a soft type at a target moment, at most one resource type among resource types of DU serving cells of different parent IAB nodes is configured as a target type at the target moment, and the target type is at least one of the following: a Hard type, a Soft type, or a not available (non-NA) type.

2. The method according to claim 1, wherein the determining the target resource type according to the resource type indication information received from the at least one of the parent IAB nodes comprises:

performing as scheduled by master cell group (MCG).

3. The method according to claim 1, wherein the determining the target resource type according to the resource type indication information received from the at least one of the parent IAB nodes further comprises:

determining the target resource type according to a first configuration manner of resource types and the resource type indication information, wherein in the first configuration manner of the resource types, configured objects of the resource types are a first configured object and a second configured object, wherein the first configured object is a MT cell or a MT cell group, and the second configured object is a DU cell corresponding to the MT cell or the MT cell group.

4. The method according to claim 1, wherein resource type configuration information of the DU cell is at least exchanged through second target information transmitted between central units.

5. The method according to claim 1, wherein in a case that the resource type configuration does not meet the resource type configuration condition, a resource configuration does not meet a limitation on the resource configuration, or resource type indication does not meet the indication limitation, reporting an error to a central unit (CU) or at least one of the parent IAB nodes.

6. The method according to claim 1, wherein the target resource type is a Hard type, wherein a resource of the Hard type is a resource available to IAB DU.

7. A communication device, comprising:

a processor; and a memory storing a program or instruction that is executable on the processor, wherein the program or instruction, when executed by the processor, causes the communication device to perform the following steps:

based on being connected to at least two parent integrated access backhaul (IAB) nodes, determining the target resource type according to resource type indication information received from at least one of the parent IAB nodes;

wherein the determining the target resource type according to the resource type indication information received from the at least one of the parent IAB nodes comprises:

processing the resource type indication information according to a preset processing rule to determine the target resource type; and determining the target resource type based on the resource type indication information and an obtained limiting condition;

wherein the processing the resource type indication information according to the preset processing rule to determine the target resource type comprises:

based on resource overlap between resources of a child IAB distributed unit (DU), indicated as available by the resource type indication information received from one of the at least two parent IAB nodes, and resources for child IAB mobile termination (MT) transmission, scheduled by scheduling information received from another of the at least two parent IAB nodes, determining a resource type of an overlapping resource according to the scheduling information; and the determining the target resource type based on the resource type indication information and the obtained limiting condition comprises:

in a case that resources of a DU serving cell of an IAB node overlap with resources of an IAB MT serving cell belonging to a different cell group or a DU serving cell of a different parent IAB node, causing a resource type configuration configured through higher layer signaling to meet the following resource type configuration condition:

the resource type configuration condition comprises: in a case that the DU serving cell of the IAB node is configured as a soft type at a target moment, at most one resource type among resource types of DU serving cells of different parent IAB nodes is configured as a target type at the target moment, and the target type is at least one of the following: a Hard type, a Soft type, or a not available (non-NA) type.

8. The communication device according to claim 7, wherein the determining the target resource type according to the resource type indication information received from the at least one of the parent IAB nodes comprises:

performing as scheduled by master cell group (MCG).

9. The communication device according to claim 7, wherein the determining the target resource type according to the resource type indication information received from the at least one of the parent IAB nodes further comprises:

determining the target resource type according to a first configuration manner of resource types and the resource type indication information, wherein in the first configuration manner of the resource types, configured objects of the resource types are a first configured object and a second configured object, wherein the first configured object is a MT cell or a MT cell group, and the second configured object is a DU cell corresponding to the MT cell or the MT cell group.

10. The communication device according to claim 7, wherein resource type configuration information of the DU cell is at least exchanged through second target information transmitted between central units.

11. The communication device according to claim 7, wherein the target resource type is a Hard type, wherein a resource of the Hard type is a resource available to IAB DU.

12. The communication device according to claim 7, wherein in a case that the resource type configuration does not meet the resource type configuration condition, a resource configuration does not meet a limitation on the resource configuration, or resource type indication does not meet the indication limitation, reporting an error to a central unit (CU) or at least one of the parent IAB nodes.

13. A non-transitory readable storage medium storing a program or instruction, wherein the program or instruction, when executed by a processor, performs the following steps:

based on being connected to at least two parent integrated access backhaul (IAB) nodes, determining the target resource type according to resource type indication information received from at least one of the parent IAB nodes;

wherein the determining the target resource type according to the resource type indication information received from the at least one of the parent IAB nodes comprises:

processing the resource type indication information according to a preset processing rule to determine the target resource type; and determining the target resource type based on the resource type indication information and an obtained limiting condition;

wherein the processing the resource type indication information according to the preset processing rule to determine the target resource type comprises:

based on resource overlap between resources of a child IAB distributed unit (DU), indicated as available by the resource type indication information received from one of the at least two parent IAB nodes, and resources for child IAB mobile termination (MT) transmission, scheduled by scheduling information received from another of the at least two parent IAB nodes, determining a resource type of an overlapping resource according to the scheduling information; and the determining the target resource type based on the resource type indication information and the obtained limiting condition comprises:

in a case that resources of a DU serving cell of an IAB node overlap with resources of an IAB MT serving cell belonging to a different cell group or a DU serving cell of a different parent IAB node, causing a resource type configuration configured through higher layer signaling to meet the following resource type configuration condition:

the resource type configuration condition comprises: in a case that the DU serving cell of the IAB node is configured as a soft type at a target moment, at most one resource type among resource types of DU serving cells of different parent IAB nodes is configured as a target type at the target moment, and the target type is at least one of the following: a Hard type, a Soft type, or a not available (non-NA) type.

14. The non-transitory readable storage medium according to claim 13, wherein the target resource type is a Hard type, wherein a resource of the Hard type is a resource available to IAB DU.

15. The non-transitory readable storage medium according to claim 13, wherein the determining the target resource type according to the resource type indication information received from the at least one of the parent IAB nodes comprises:

performing as scheduled by master cell group (MCG).

16. The non-transitory readable storage medium according to claim 13, wherein the determining the target resource type according to the resource type indication information received from the at least one of the parent IAB nodes further comprises:

determining the target resource type according to a first configuration manner of resource types and the resource type indication information, wherein in the first configuration manner of the resource types, configured objects of the resource types are a first configured object and a second configured object, wherein the first configured object is a MT cell or a MT cell group, and the second configured object is a DU cell corresponding to the MT cell or the MT cell group.

17. The non-transitory readable storage medium according to claim 13, wherein resource type configuration information of the DU cell is at least exchanged through second target information transmitted between central units.

18. The non-transitory readable storage medium according to claim 13, wherein in a case that the resource type configuration does not meet the resource type configuration condition, a resource configuration does not meet a limitation on the resource configuration, or resource type indication does not meet the indication limitation, reporting an error to a central unit (CU) or at least one of the parent IAB nodes.

* * * * *